US 9,434,263 B2

(12) United States Patent
Khan et al.

(10) Patent No.: US 9,434,263 B2
(45) Date of Patent: Sep. 6, 2016

(54) MULTI-MODE BATTERY CHARGER (71) Applicant: Lear Corporation, Southfield, MI (US)

(72) Inventors: Aftab Ali Khan, Dearborn, MI (US); Richard J. Hampo, Plymouth, MI (US); Veda Prakash Galigekere, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 55 days.

(21) Appl. No.: 14/014,585

(22) Filed: Aug. 30, 2013

(65) Prior Publication Data

US 2014/0062394 A1 Mar. 6, 2014

Related U.S. Application Data (60) Provisional application No. 61/696,996, filed on Sep. 5, 2012.

(51) Int. Cl.
H02J 7/00 (2006.01)
B60L 11/18 (2006.01)

(52) U.S. Cl.
CPC .......... *B60L 11/1812* (2013.01); *B60L 11/182* (2013.01); *B60L 11/185* (2013.01); *B60L 11/1816* (2013.01); *B60L 11/1818* (2013.01); *B60L 2240/80* (2013.01); *Y02T 10/7005* (2013.01); *Y02T 90/121* (2013.01); *Y02T 90/122* (2013.01); *Y02T 90/127* (2013.01); *Y02T 90/128* (2013.01); *Y02T 90/14* (2013.01)

(58) Field of Classification Search
CPC .................................................. Y02T 10/7094
USPC ................................ 320/116, 124, 137–138
See application file for complete search history.

(56) References Cited

U.S. PATENT DOCUMENTS

| 8,183,818 | B2 | 5/2012 | Elhalis |
| 8,395,348 | B1 | 3/2013 | Saatchi et al. |
| 8,482,260 | B2 * | 7/2013 | Hsieh .................... H02J 7/0068 307/66 |
| 8,810,198 | B2 * | 8/2014 | Nergaard et al. ............. 320/109 |

(Continued)

FOREIGN PATENT DOCUMENTS

| CN | 101707384 A | 5/2010 |
| CN | 102593883 A | 7/2012 |

(Continued)

OTHER PUBLICATIONS

Machine English translation of the Chinese Ofifce Action corresponding Application No. 201310398560.2, mailed Dec. 4, 2015, pp. 10.*

(Continued)

Primary Examiner — Nghia Doan
(74) Attorney, Agent, or Firm — Brooks Kushman P.C.

(57) ABSTRACT

In one embodiment a multi-mode battery charger for a vehicle is provided. The charger includes a controller. The controller is electrically coupled to a plurality of charging systems. Each charging system is configured to provide a first power from an external power source and to convert the first power into a second power that is suitable for storage on at least one battery on the vehicle. The controller is configured to enable a first charging system of the plurality of charging systems to provide the first power based on a charging priority order in the event two or more of the plurality of charging systems are each determined to provide the first power to the vehicle at the same time.

17 Claims, 5 Drawing Sheets

(56) References Cited

U.S. PATENT DOCUMENTS

| | | |
|---|---|---|
| 8,810,205 B2 | 8/2014 | Ichikawa |
| 8,841,881 B2 * | 9/2014 | Failing .................. 320/109 |
| 8,957,632 B2 | 2/2015 | Gu |
| 2009/0167254 A1 | 7/2009 | Eberhard et al. |
| 2011/0298422 A1 * | 12/2011 | Failing ............... B60L 3/00 320/109 |
| 2012/0161697 A1 | 6/2012 | Park et al. |
| 2013/0020993 A1 | 1/2013 | Taddeo et al. |

FOREIGN PATENT DOCUMENTS

| | | |
|---|---|---|
| EP | 1246336 A2 | 10/2002 |
| EP | 1328055 A2 | 7/2003 |
| JP | 2010230932 A | 10/2010 |
| WO | 2010131349 A1 | 11/2010 |

OTHER PUBLICATIONS

Chinese Office Action for corresponding Application No. 201310398560.2, mailed Mar. 30, 2015, 9 pages.

Chinese Office Action for corresponding Application No. 201310398560.2, mailed Dec. 4, 2015, 8 pages.

* cited by examiner

MULTI-MODE BATTERY CHARGER

CROSS-REFERENCE TO RELATED APPLICATIONS

This application claims the benefit of U.S. provisional Application No. 61/696,996 filed Sep. 5, 2012, the disclosure of which is incorporated in its entirety by reference herein.

TECHNICAL FIELD

Embodiments disclosed herein generally relate to a multi-mode battery charger that may be used in a vehicle.

BACKGROUND

U.S. Publication No. 2013/0020993 to Taddeo et al. ("Taddeo") discloses a multi-mode electric vehicle charging station. For example, Taddeo discloses a reduced size and complexity multi-mode electric vehicle charging station which allows a user to select AC and DC powerform output and may provide those outputs to connectors for charging electric vehicles. A voltage source is provided to a DC converter that then outputs to a DC bus or electrical connection. The DC bus may be accessed by DC charging equipment or a DC-AC inverter that is connected to AC charging equipment, thereby providing DC and AC charging ability. In one aspect, the multi-mode electric vehicle charging station is used in a rescue vehicle for charging stranded EVs via multiple charging standards without requiring the rescue vehicle to carry independent charging systems for each charging standard. In another aspect, the charging station is used in a stationary charging station to reduce cost and complexity of using multiple independent charging systems.

SUMMARY

In one embodiment a multi-mode battery charger for a vehicle is provided. The charger includes a controller. The controller is electrically coupled to a plurality of charging systems. Each charging system is configured to provide a first power from an external power source and to convert the first power into a second power that is suitable for storage on at least one battery on the vehicle. The controller is configured to enable a first charging system of the plurality of charging systems to provide the first power based on a charging priority order in the event two or more of the plurality of charging systems are each determined to provide the first power to the vehicle at the same time.

In another embodiment, a multi-mode battery charger for a vehicle is provided. The charger includes a controller and a single isolator circuit. The controller is electrically coupled to a plurality of charging systems. Each charging system is configured to provide a first power from an external power source and to convert the first power into a second power that is suitable for storage on at least one battery on the vehicle. Each of the plurality of charging systems include a single isolator circuit such that the first power is passed through the single isolator circuit only once for each charging system.

In another embodiment, a multi-mode battery charger for a vehicle is provided. The charger includes a controller. The controller is electrically coupled to a plurality of charging systems. Each charging system is configured to provide a first power from an external power source and to convert the first power into a second power that is suitable for storage on at least one battery on the vehicle. The controller is configured to enable a first charging system of the plurality of charging systems to charge the at least one battery with the second power if the first charging system charges the at least one battery at a first period of time that is less than a second period of time for any remaining charging systems of the plurality of charging systems to charge the at least one battery.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein.

There are various types of charging implementations (or methods) that may be used to charge one or more batteries in a vehicle. Conductive charging generally utilizes an on-board vehicle charging system that receives power from an external power source (e.g., power supply in a residence or commercial establishment). With conductive charging, the power received from the external power source is conducted (galvanic) via physical conductors to the vehicle on-board charger. Conductive charging converts the power received from the external power source into a power that is suitable for storage on at least one battery in the vehicle.

Inductive charging generally utilizes a wireless transmission of power from the external power source to an input of the on-board vehicle charging system via electromagnetic or inductive coupling. The external power source and the on-board vehicle charging system may be inductively coupled but galvanically isolated. Inductive charging converts the power (i.e., first power) received from the external power source into a power (i.e., second power) that is suitable for storage on at least one battery in the vehicle. Inductive charging may be resonant or non-resonant.

DC quick charge or fast charge generally utilizes power from the external power source similar to that of conductive charging. An off-board power conditioner converts the power from the external power source (i.e., first power) into a suitable DC voltage (i.e., second power) for delivery, conductively, to the vehicle. The charging of at least one battery on the vehicle may be performed at a relatively high current to significantly reduce the charging time. Substantially all of the power electronic conditioning may be done on the off-board power conditioner. The on-board vehicle charging system may include, among other things, a contactor, associated safety mechanisms, and communications.

Figure 1:
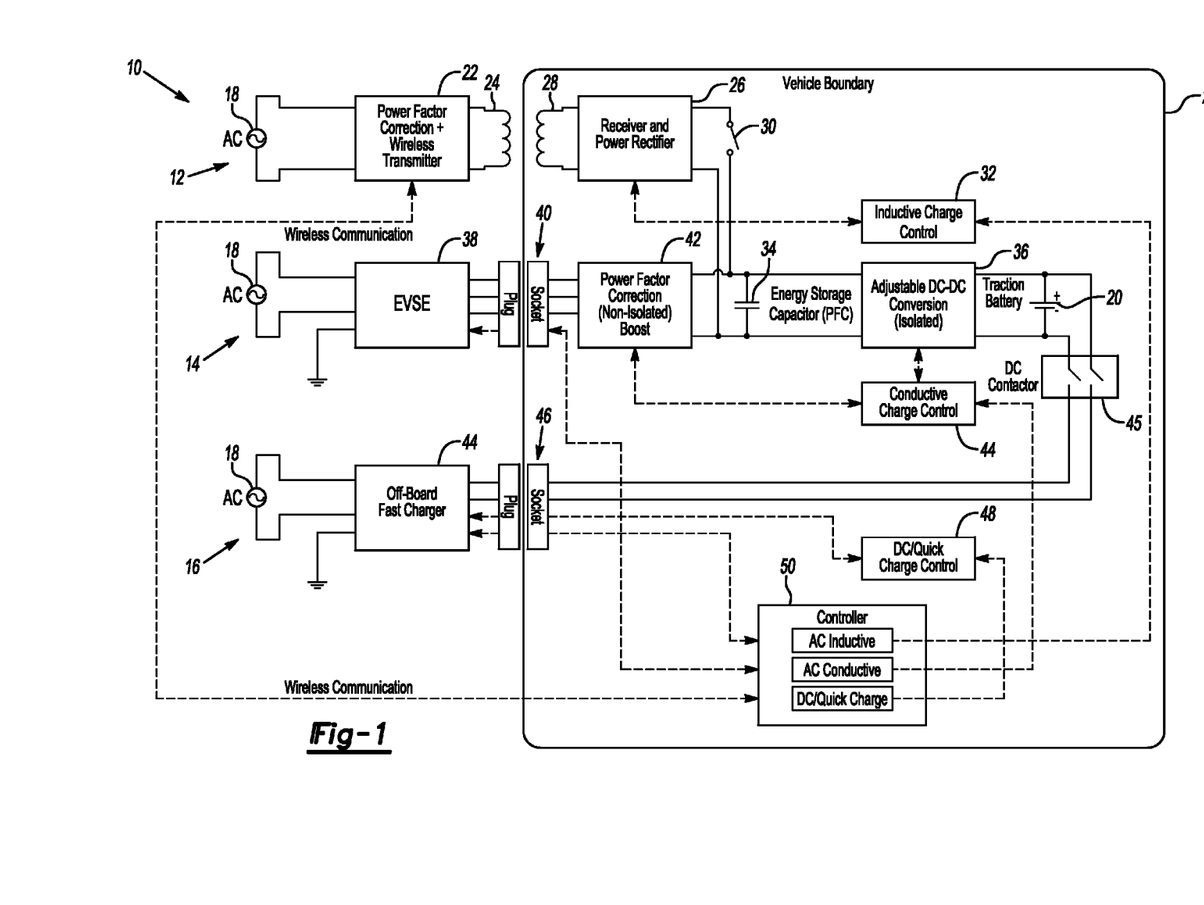
FIG. 1 depicts a first multi-mode charging system in accordance to one embodiment.

FIG. 1 depicts a first multi-mode charging system 10 in accordance to embodiment. The apparatus 10 comprises an inductive charging system 12, a conductive charging system 14, and an off-board charging system 16 (or fast charging system 12). The inductive charging system 12 generally employs wireless transmission power from an external source 18 to a battery 20 positioned on a vehicle 21.

The inductive charging system 12 generally comprises a wireless transmitter 22 including a primary coil 24, a receiver 26 including a secondary coil 28, a switch 30, an inductive charge control 32, a capacitor 34, and a converter 36. The primary coil 24 and the secondary coil 28 generally form a transformer and enable inductive charging as described in co-pending provisional patent application, entitled "Apparatus for Providing Concentrated Inductive Power Transfer," U.S. Provisional Application Ser. No. 61/696,995 filed on Sep. 5, 2012 the disclosure of which is hereby incorporated by reference in its entirety.

In general, power flows from the external source 18 through the wireless transmitter 22 to the receiver 26 on the vehicle 21. The switch 30 is closed to enable the power to be stored on the capacitor 34 and subsequently converted via the converter 36 into a DC voltage that is suitable for storage on the battery 20. The inductive charge control 32 is configured to control one or more parameters of the electrical power transfer between the wireless transmitter 22 and the receiver 26.

The conductive charging system 14 generally comprises a charger 38 (portable or non-portable), a first physical connection (e.g., plug and socket) 40, a power factor correction (non-isolated) 42, a conductive change control 44, a contactor 45, the capacitor 34, and the converter 36. The conductive charging system 14 generally receives the AC power from the external source 18 via the first physical connection 40. The power factor correction 42 converts the AC power into a high DC voltage and the converter 36 processes the high DC voltage into a voltage that is suitable for storage on the battery 20. The conductive charge control 44 is configured to control one or more parameters of the electrical power transfer between the charger 38 and the power factor correction 42.

The off-board charging system 16 generally comprises a fast charger (including conditioning circuitry therein) 44, a second physical connection (e.g., plug and socket) 46, and a DC Quick Charge Control 48. The fast charger 16 is positioned off of the vehicle 21 and generally includes power electronic conditioning circuitry for conditioning and converting power from the power source 18 for rapid delivery at a high current to the battery 20. A controller 50 is operably coupled to the wireless transmitter 22, the conductive charge control 44 and the off board charging system 16. The controller 50 detects which method the user has selected to charge the battery 20. For example, the controller 50 further includes a user interface in which the user can select which charge method he/she intends to charge the battery 20 in the vehicle 21. In response to such a selection, the controller 50 may activate the corresponding control (e.g., inductive charge control 32, conductive charge control 36, or off-board charge control 48) to allow the selected method of charging to be performed.

In the event the user has not made a selection via the user interface, the controller 50 detects which charging method has been employed via proximity detectors and/or voltage detection and enables the corresponding control (e.g., inductive charge control 32, conductive charge control 44, or off-board charge control 48) to perform the desired charging method. For example, with respect to inductive charging, the inductive charging system 10 includes a number of position sensors, a number of voltage sensors and a communication system (e.g., wireless communication between the transmitter 22 and the controller 50). When the vehicle 21 is detected to be within a predetermined range of the position sensor(s) and a voltage is detected to be within a predetermined range of voltage, the transmitter 22 wireless communicates with the controller 50. The controller 50 may then activate the inductive charge control 32 to control the charging between the transmitter 22 and the receiver 26 and also closes the switch 30 to enable power transfer to the battery 20.

For conductive charging, communication is established upon the plug and socket 40 being coupled to one another. The controller 50 and the charger 38 engage in bi-directional communication and the communication from the charger 38 and serves as an indication that vehicle 21 will be charged via conductive charging. Voltage detection may also be employed along with the communication to indicate that the vehicle 21 is coupled to the charger 38. In response to the communication from the charger 38, the controller 50 then activates the conductive charge control 44 to control the charging between the charger 38 and the power factor correction 42. The controller 50 also activates the contactor 45 to enable the power transfer to the battery 20.

For off-board charging (or fast charging), communication is established upon the plug and socket 46 being coupled to one another. The controller 50 and the off-board charger 44 engage in bi-directional communication and the communication from the off-board charger 44 serves as an indication that the vehicle 21 will be charged via fast charging. Voltage detection may also be employed along with the communication to indicate that the vehicle 21 is coupled to the off-board charger 44. In response to the communication from the off-board charger 44, the controller 50 then activates the quick charge control 48 to control the charging of the off-board charger 44. The controller 50 also activates the contactor 45 to enable the power transfer to the battery 20.

In the event multiple charging methods are performed (or detected) at the same time, the controller 50 employs a prioritization scheme. These features will be discussed in more detail in connection with FIG. 5.

It is recognized that for each charging system 12, 14, and 16, a single isolator should be provided. For example, a single isolator enables the condition in which power does not flow through a transformer more than once or power flows through the isolator only once. In reference to the inductive charging system 12, galvanic isolation is present between the primary coil 24 and the secondary coil 28, due to the inherent nature of inductive coupling. Galvanic isolation is generally provided when two or more electrical circuits have grounds that are at different potentials. Additionally, the converter 36 also provides galvanic isolation within the system 10 when used in connection with the conductive charging system 14. However, such a redundant isolation (e.g., the use of the converter 36 being isolated) for purposes of the inductive charging system 12 may not be needed. Further, in reference to the off board charging system 46, the off board charger 44 performs the conditioning of the power which is in a state that is ready for the battery 20 to receive directly. Thus, the isolation occurs in the off-board charger 44, not on the vehicle 21.

Figure 2:
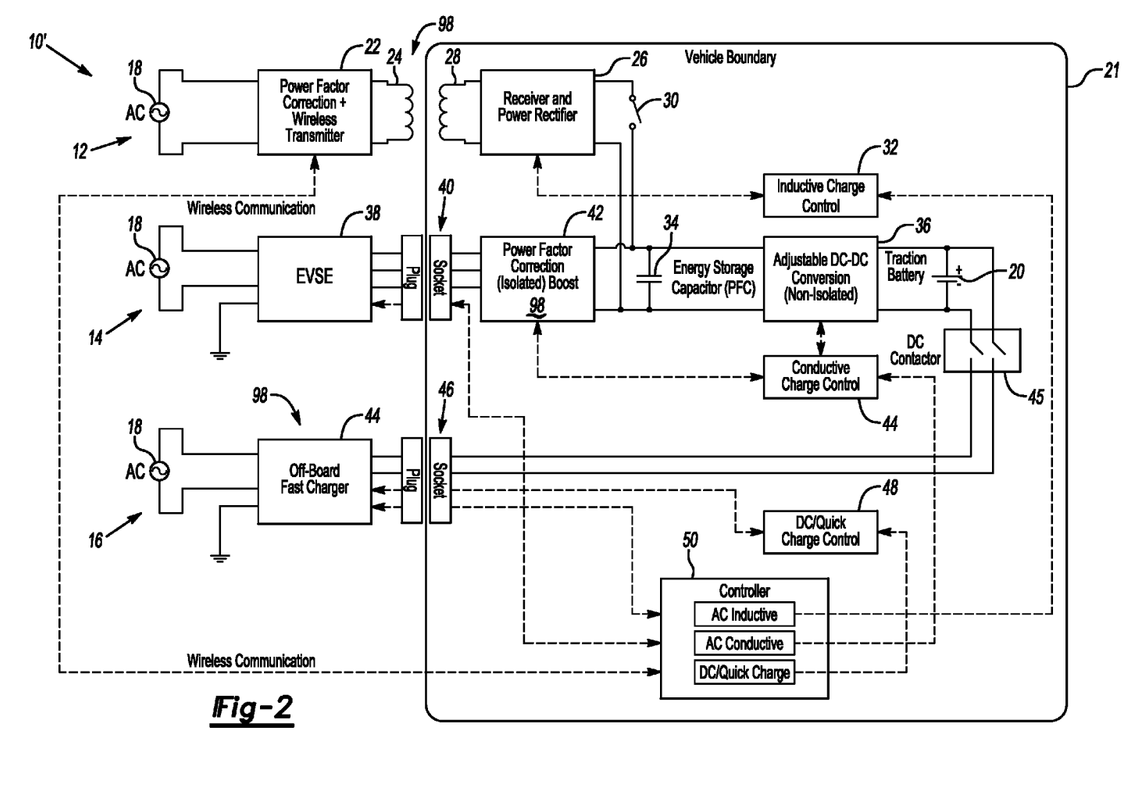
FIG. 2 depicts a second multi-mode charging system in accordance to one embodiment.

FIG. 2 depicts a second multi-mode charging system 10' in accordance to embodiment. The system 10' is generally similar to the first multi-mode charging system 10 with the exception of the converter 36 being implemented in a non-isolated condition. In general, it may be desirable to include one isolator 98 (or a single isolator circuit) for a given charging system (or charging mode (e.g., inductive charging, conductive charging, and DC quick charge) as multiple isolation paths for a charging mode or system may lead to electrical losses. By implementing the converter 36 as a non-isolator, the redundant isolation as noted in connection with the system 10 of FIG. 1 may be removed. For example, a single isolator 98 is provided in the inductive charging system 12 (e.g., physical isolation between primary coil 24 and the secondary coil 28), a single isolator 98 is provided in the conductive charging system 14 (e.g., power correction factor 42 implemented as an isolator), and a single isolator 98 is positioned on the off-board charger 44. This condition enables power to pass through a single isolation point for each charging system.

Figure 3:
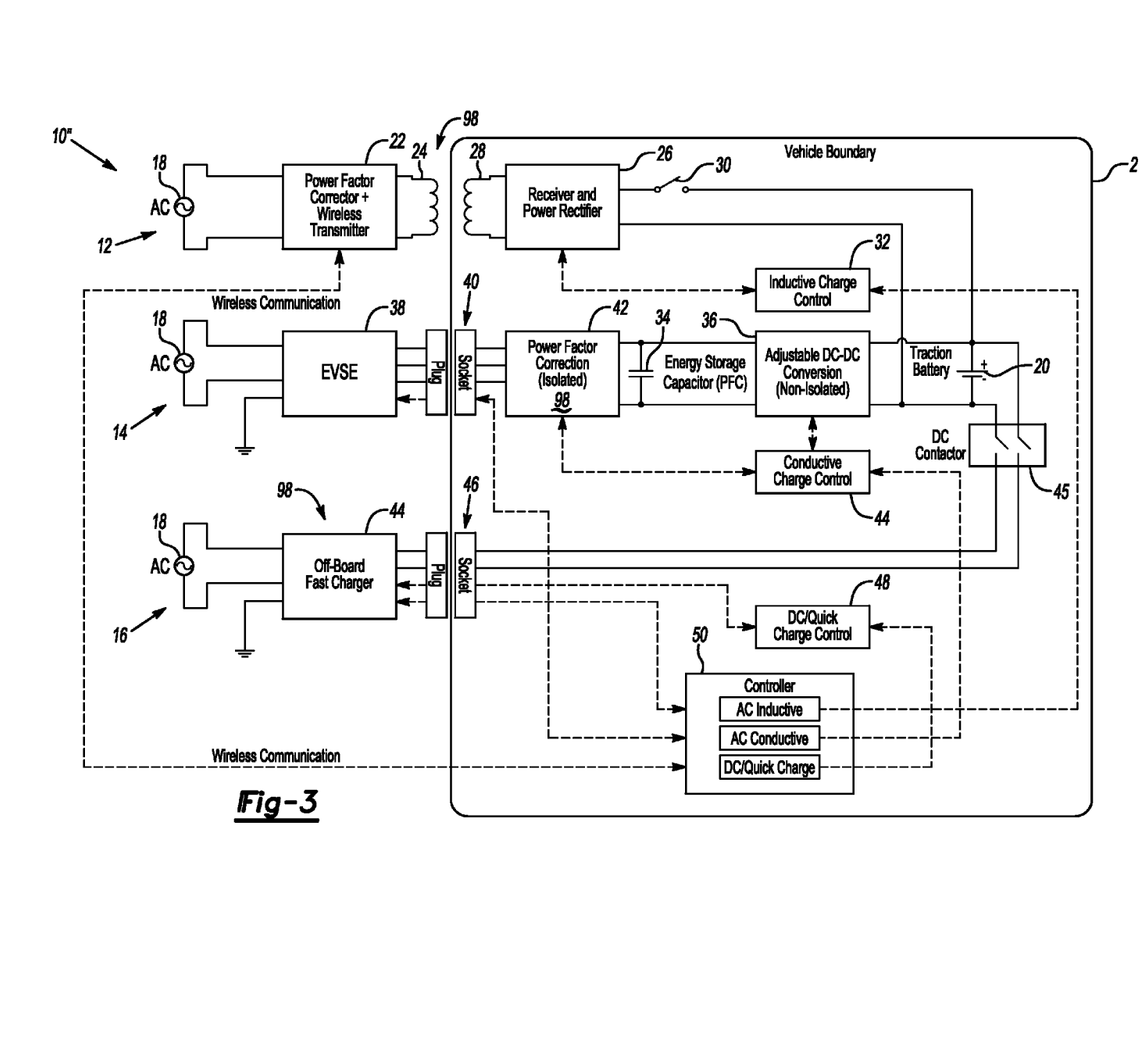
FIG. 3 depicts a third multi-mode charging system in accordance to one embodiment.

FIG. 3 depicts a third multi-mode charging system 10" in accordance to embodiment. In this system 10", the output from the receiver 26 (or power rectifier) is fed directly to the battery 20 for the inductive charging system 12. This condition may reduce complexity and may increase efficiency. The systems 10 and 10' depict that the output from the receiver 26 is fed to the converter 36 prior to it being fed to the battery 20.

Figure 4:
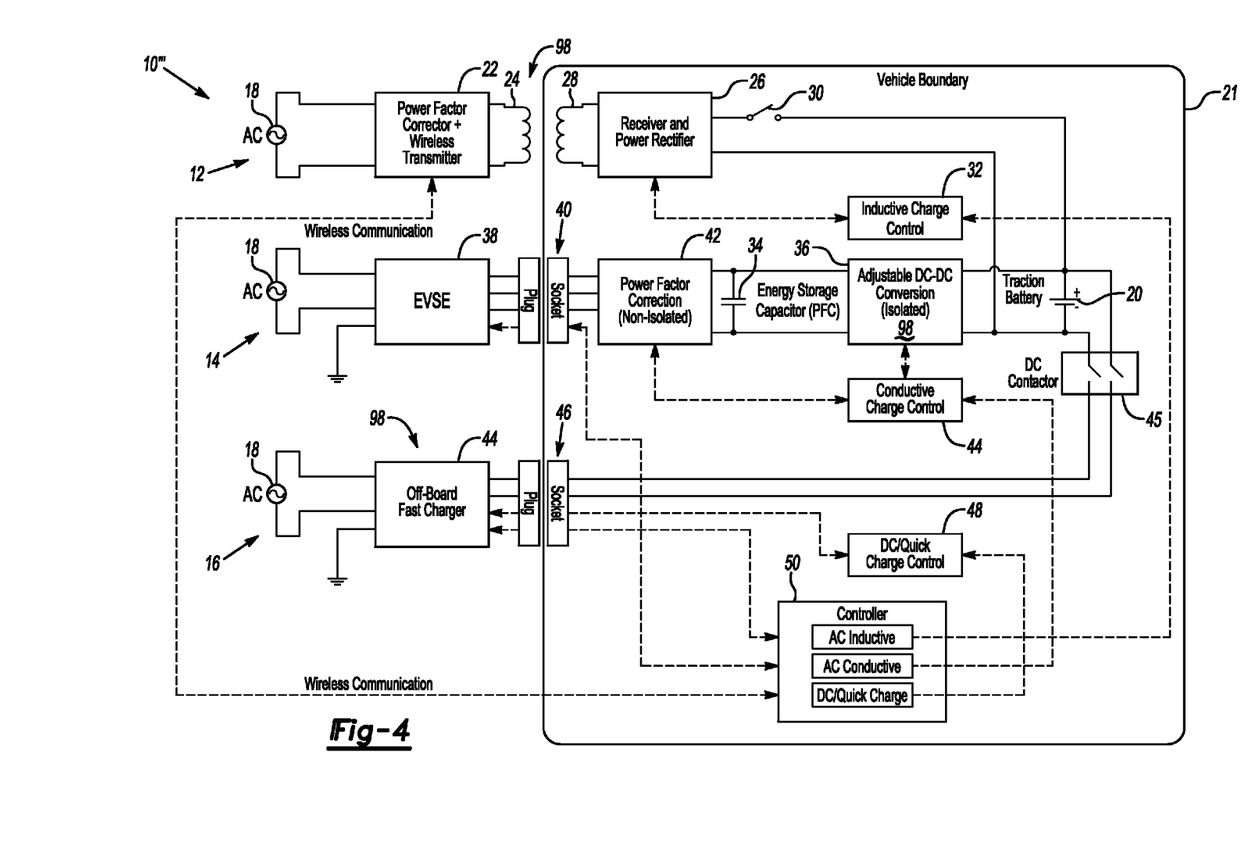
FIG. 4 depicts a fourth multi-mode charging system in accordance to one embodiment.

FIG. 4 depicts a fourth multi-mode charging system 10''' in accordance to embodiment. The system 10''' is generally similar to the system 10" of FIG. 3 in that the output from the receiver 26 (or power rectifier) is fed directly to the battery 20 for the inductive charging system 12. However, system 10''' depicts that the power correction factor 42 is now implemented as an isolator and that the converter 36 is now implemented as a non-isolator. This condition is switched in the system 10".

While each system 10, 10', 10", and 10''' may include each of the inductive charging system 12, the conductive charging system 14, and the off-board charging system 16, it is recognized that a multi-mode charging system may still be provided within any two of the three charging methods. The implementation as to which two of the three multi-mode charging systems may vary depending on the particular implementation that is desired.

Figure 5:
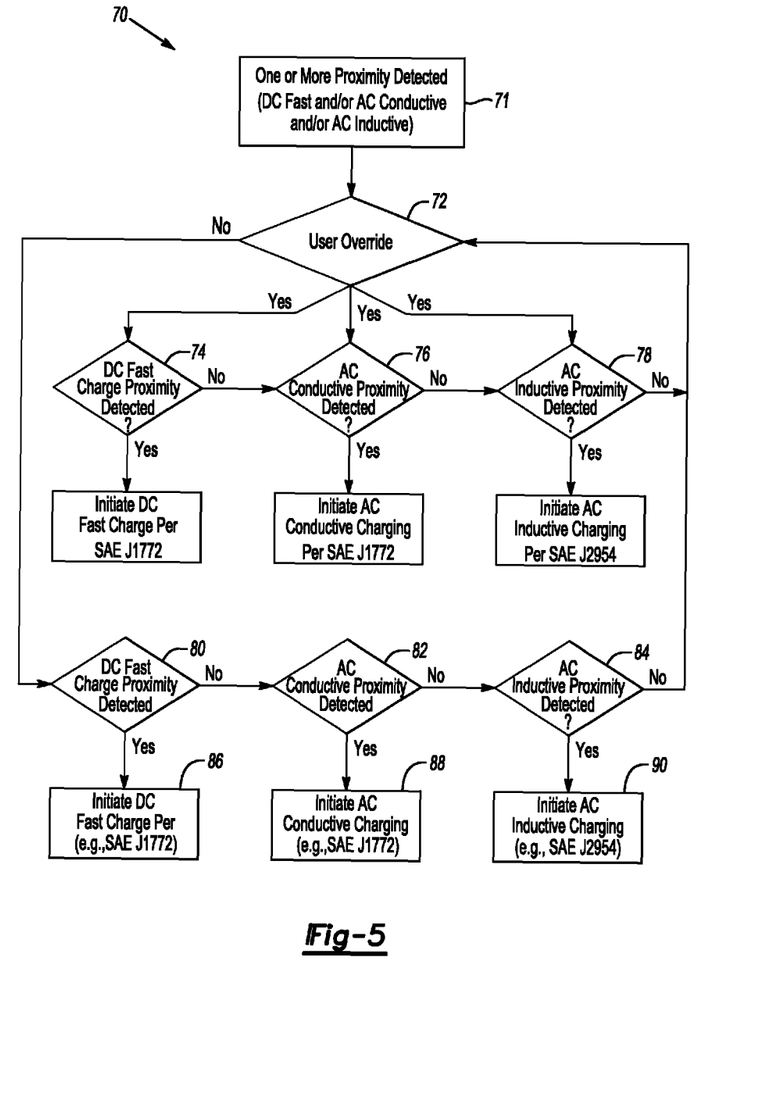
FIG. 5 depicts a method for prioritizing between one or more charging schemes in accordance to one embodiment.

FIG. 5 depicts a method 70 for prioritizing between one or more charging schemes (or systems) in accordance to one embodiment.

In operation 71, the controller 50 monitors at least one output from at least one proximity detector (or monitors at least one voltage output via voltage detection) to determine if the user has initiated charging (e.g., without selection via the user interface on the controller 50) the vehicle 21 via the inductive charging system 12, the conductive charging system 14, and the off-board charging system 16. If the user has initiated charging the vehicle 21 without the use of the user interface via the inductive charging system 12, the conductive charging system 14, or the off-board charging system 16, then the method 70 moves to operation 80, 82, or 84 which will be described in more detail below. If the user has not initiated charging the vehicle 21 via the inductive charging system 12, the conductive charging system 14, or the off-board charging system 16, then the method 70 moves to operation 72.

In operation 72, the controller 50 determines whether the user has selected a particular charging method (e.g., inductive charging, conductive charging, or off-board charging) via the user interface. If the controller 50 determines that the user has selected a particular charging method via the user interface, then the method 70 proceeds to operation 74, 76, or 78 depending on the charging method selected by the user. Operation 74 is executed if the user has selected the DC fast charge (e.g., off-board charge). The DC fast charge may be performed in accordance to per SAE J1772 or other suitable format. Operation 76 is executed if the user has selected the AC conductive charge. The AC conductive charge may be performed in accordance to per SAE J1772 or other suitable format. Operation 78 is executed if the user has selected the AC inductive charge. The AC inductive charge may be performed in accordance to per SAE J1772 or other suitable format.

In the event the controller 50 determines that a user has not made a selection as to the manner in which the battery 20 is to be charged via the user interface, then the method 50 moves to operation 80, 82, or 84 depending on which charge method has been employed by the user. For example, in operation 80, if the controller 50 detects a DC fast charge, then such a charge method is executed as in operation 86. If not, then the method 70 moves to operation 82. In operation 82, if the controller 50 detects an AC conductive charge, then such a charge method is executed as in operation 88. If not, then the method 70 moves operation 84. In operation 84, if the controller 50 detects an AC inductive charge, then such a charge method is executed as in operation 90.

As exhibited above, the charge method with the highest priority is the DC fast charge method since this enables charging of the battery 20 faster than the other charge methods. The charge method with the next highest priority is the AC conductive charge method since this enables charging the battery 20 faster than the AC inductive charge method. Finally, the AC inductive charge method is performed if the other charge methods are not detected or triggered. The charging times for the various charging methods are illustrated in the following examples: (i) the DC fast charge operation may enable the vehicle 21 to be charged within thirty minutes, (ii) the conductive charge operation may enable the vehicle 21 to be charged between four to eight hours, and (iii) the inductive charge operation may enable the vehicle 21 to be charged between four to twelve hours.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A multi-mode battery charger for a vehicle comprising:
    a controller for being electrically coupled to a plurality of charging systems, each charging system being configured to provide a first power from an external power source and to convert the first power into a second power that is suitable for storage on at least one battery on the vehicle, the controller being configured to enable a first charging system of the plurality of charging systems to provide the first power based on a charging priority order in the event two or more of the plurality of charging systems are each determined to provide the first power to the vehicle at the same time,
    wherein the plurality of charging systems comprise an inductive charging system, a conductive charging system, and a direct current (DC) quick charging system, and
    wherein the inductive charging system includes a receiver and a power rectifier positioned on the vehicle for providing the second power directly to the battery.

2. The charger of claim 1 wherein the controller is further configured to enable the DC quick charging system to convert the first power into the second power for storage on the at least one battery in the event the controller determines that the DC quick charging system and at least one of the inductive charging system and the conductive charging system provides the first power to the vehicle at the same time.

3. The charger of claim 1 wherein the controller is further configured to enable the conductive charging system to convert the first power into the second power for storage on the at least battery in the event the controller determines that the conductive charging system and the inductive charging system provides the first power to the vehicle at the same time.

4. The charger of claim 1 wherein at least a portion of the conductive charging system includes a converter for converting the first power into the second power and for galvanically isolating the conductive charging system.

5. The charger of claim 1 wherein the controller is further configured to be electrically coupled to a single isolator circuit for each of the plurality of charging systems, and wherein the first power is passed through the single isolator circuit only once for each charging system.

6. The charger of claim 1 wherein the charging priority order is based on a period of time the plurality of charging systems charge the at least one battery with the second power.

7. A multi-mode battery charger for a vehicle comprising:
    a controller for being electrically coupled to a plurality of charging systems, each charging system being configured to provide a first power from an external power source and to convert the first power into a second power that is suitable for storage on at least one battery on the vehicle, wherein the controller is further configured to be electrically coupled to a single isolator circuit for each of the plurality of charging systems, and wherein the first power is passed through the single isolator circuit only once for each charging system,
    wherein the plurality of charging systems comprise an inductive charging system, a conductive charging system, and a direct current (DC) quick charging system, and
    wherein the inductive charging system includes a receiver and a power rectifier positioned on the vehicle for providing the second power directly to the battery.

8. The charger of claim 7 wherein the controller is further configured to enable a first charging system of the plurality of charging systems to provide the first power based on a charging priority order in the event two or more of the plurality of charging systems are each determined to provide the first power to the vehicle at the same time.

9. The charger of claim 8 wherein the charging priority order is based on a speed in which the plurality of charging systems charge that at least one battery with the second power.

10. The charger of claim 8 wherein the plurality of charging systems comprise an inductive charging system, a conductive charging system, and a direct current (DC) quick charging system.

11. The charger of claim 10 wherein the controller is further configured to enable the DC quick charging system to convert the first power into the second power for storage on the at least one battery in the event the controller determines that the DC quick charging system and at least one of the inductive charging system and the conductive charging system provides the first power to the vehicle at the same time.

12. The charger of claim 10 wherein the controller is further configured to enable the conductive charging system to convert the first power into the second power for storage on the at least one battery in the event the controller determines that the conductive charging system and the inductive charging system provides the first power to the vehicle at the same time.

13. The charger of claim 10 wherein at least a portion of the conductive charging system includes a converter for converting the first power into the second power and for galvanically isolating the conductive charging system.

14. The charger of claim 10 wherein the inductive charging system includes a receiver and a power rectifier positioned on the vehicle for providing the second power directly to the battery.

15. A multi-mode battery charger for a vehicle comprising:
    a controller for being electrically coupled to a plurality of charging systems, each charging system being configured to provide a first power from an external power source and to convert the first power into a second power that is suitable for storage on at least one battery on the vehicle, the controller being configured to enable a first charging system of the plurality of charging systems to charge the at least one battery with the second power if the first charging system charges the at least one battery at a first period of time that is less than a second period of time for any remaining charging systems of the plurality of charging systems to charge the at least one battery,
    wherein the plurality of charging systems comprise an inductive charging system, a conductive charging system, and a direct current (DC) quick charging system, and wherein the inductive charging system includes a receiver and a power rectifier positioned on the vehicle for providing the second power directly to the battery.

16. The charger of claim 15 wherein the controller is further configured to enable the DC quick charging system to convert the first power into the second power for storage on the at least one battery in the event the controller determines that the DC quick charging system and at least one of the inductive charging system and the conductive charging system provides the first power to the vehicle at the same time.

17. The charger of claim 15 wherein the controller is further configured to enable the conductive charging system to convert the first power into the second power for storage on the at least one battery in the event the controller determines that the conductive charging system and the inductive charging system provides the first power to the vehicle at the same time.

\* \* \* \* \*

UNITED STATES PATENT AND TRADEMARK OFFICE
CERTIFICATE OF CORRECTION

| | | |
|---|---|---|
| PATENT NO. | : 9,434,263 B2 | Page 1 of 1 |
| APPLICATION NO. | : 14/014585 | |
| DATED | : September 6, 2016 | |
| INVENTOR(S) | : Aftab Ali Khan et al. | |

It is certified that error appears in the above-identified patent and that said Letters Patent is hereby corrected as shown below:

In the Claims

Column 7, Line 42, Claim 3:

After "on the at least"
Insert -- one --.

Signed and Sealed this
Twenty-seventh Day of December, 2016

Michelle K. Lee
*Director of the United States Patent and Trademark Office*